(No Model.)
G. H. WILLIAMS.
HEEL AND SOLE PROTECTOR.
No. 587,500. Patented Aug. 3, 1897.
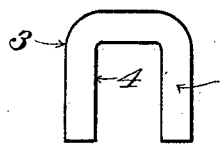
Fig. 2.
Fig. 3.
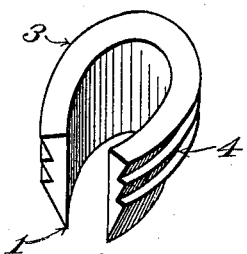
Fig. 1.
Fig. 4.
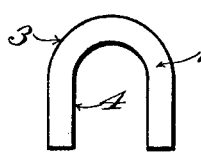
Fig. 5.
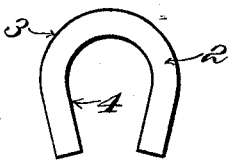
Fig. 6.
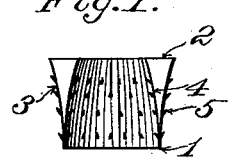
Fig. 7.
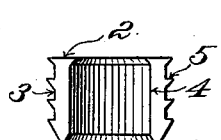
Fig. 8.
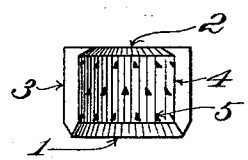
Fig. 9.
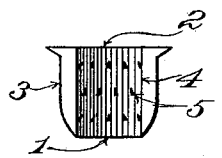
Fig. 10.
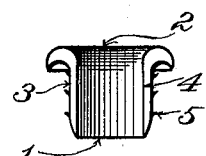
Fig. 11.
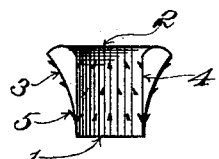
Fig. 12.
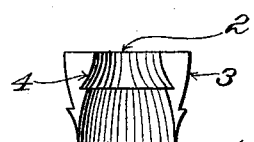
Fig. 13.
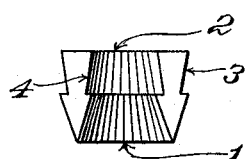
Fig. 14.
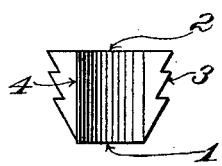
Fig. 15.
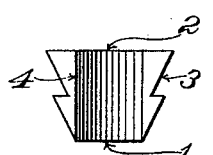
Fig. 16.
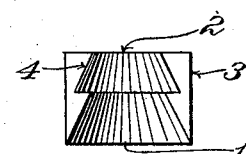
Fig. 17.
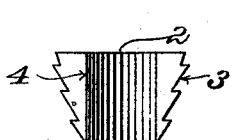
Fig. 18.
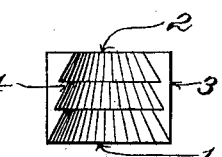
Fig. 19.
Witnesses:
Oscar F. Gill
Alice H. Morrison
Fig. 20.
Inventor:
George H. Williams
by Macleod Calver & Randall
Attorneys:

UNITED STATES PATENT OFFICE.

GEORGE H. WILLIAMS, OF NEWTON, MASSACHUSETTS, ASSIGNOR TO FRANK W. WHITCHER, OF BOSTON, MASSACHUSETTS.

HEEL OR SOLE PROTECTOR.

SPECIFICATION forming part of Letters Patent No. 587,500, dated August 3, 1897.

Application filed October 31, 1896. Serial No. 610,702. (No model.)

*To all whom it may concern:*

Be it known that I, GEORGE H. WILLIAMS, a citizen of the United States, residing at Newton, in the county of Middlesex and State of Massachusetts, have invented certain new and useful Improvements in Heel or Sole Protectors, of which the following is a specification, reference being had therein to the accompanying drawings.

My invention has for its object to provide an improved protector for the heels and soles of boots and shoes.

My invention is fully set forth in the following description, and the novel features thereof are pointed out and clearly defined in the claims at the end of this specification.

In the following description reference is made to the accompanying drawings, in which—

Figure 1 is a view in perspective of a protector embodying one form of my invention. Figs. 2, 3, 4, 5, 6, and 20 are top views or plans, enlarged, showing other forms thereof. At Figs. 7 to 19, inclusive, I have shown in elevation, enlarged, several forms of protectors embodying my invention, the said elevations corresponding in shape with the cross-sectional shape of the protector shown in each case.

Protectors as hitherto made, so far as known to me, are difficult to set or drive, are liable to be spread or distorted in setting, and when set are liable to become loosened as the leather shrinks and dries and to drop out. These are serious objections, which I am enabled to overcome by the employment of a protector made as hereinafter set forth.

A protector embodying my invention is preferably of the shape shown in plan in Figs. 2 to 6 and in Fig. 20 of the accompanying drawings. I do not, however, desire to limit myself to any particular shape, but preferably the form or shape is such as to partially inclose a portion of the leather in which the protector is set, the said inclosed portion remaining attached to the sole or heel at the mouth or open side or end of the protector. It will also be understood that when the protector is set the wear-resisting edge thereof is usually flush or substantially flush with the surface of the heel or sole.

My protector may be formed in any well-known manner, as by forging to shape or by the employment of a strip of metal which has been previously shaped to the proper form in cross-section and which is then bent to the desired shape.

Referring to the cross-sectional shape of my protector, it is so formed as to present a relatively thin or wedge-shaped entering end, which, while it facilitates the driving or setting of the protector, is yet of sufficient strength to permit it to be forced into the leather. At the opposite edge, which takes the wear when the protector is in position in the boot or shoe, I thicken the metal, so as to obtain an efficient wear-resisting face. This will be clear by reference to Fig. 7, in which the cross-sectional shape is nearly that of a wedge, the entering end being at 1, while the wear-resisting end is designated as 2, the outer and inner sides 3 and 4, respectively, being formed by a line which converges from the wear-resisting end 2 to the entering edge 1. By thus forming the protector a minimum of metal is employed, the metal being so disposed as to insure effective wear-resisting quality, while at the same time forming a protector which may be readily set with a minimum of power, a consideration which is important when the protectors are set by the aid of an automatic setting-machine, as I contemplate setting them.

To insure the protector against becoming loosened and dropping out of the heel or sole, I provide either the exterior or interior walls, or both, with slight projections 5. These are preferably formed by striking up or roughening the surface of the walls of the protector at intervals. This striking up or roughening of the walls may be effected in any well-known manner.

Instead of separate barbs or projections, two or more continuous barbs or shoulders extending from end to end of the protector around the outer or inner wall or side thereof may be employed, as shown more clearly in Fig. 1.

At Figs. 7 to 19, inclusive, protectors of varying cross-sectional shape are shown, each having projections or barbs on the exterior or interior of the protector, all of which are modified forms of securing means which serve to prevent the protector from becoming displaced or dropping out after it is in position in the sole or heel.

I form the entering edge of substantial wedge shape, while the opposite edge, which receives the wear in use, is thickened or enlarged to increase its efficiency.

I do not, save where indicated otherwise in my claims, desire to limit myself to any precise form of barb or projection or other retaining means, as this may obviously be modified in a large variety of ways.

By the employment of my invention a very efficient protector or wear-resisting device may be made, which when properly set in the sole or heel will remain in position and will not drop out or be easily displaced.

As hereinabove stated, it is usual to set the protectors flush or substantially flush with the surface of the sole or heel. In some kinds of boots or shoes which are designed for special use it is desirable that the protectors should project slightly above the surface of the heel or sole. Protectors embodying my invention herein set forth are especially adapted to be set so as to project slightly above the sole or heel, since the retaining means described serve effectually to prevent them from becoming loose and dropping or being knocked out while the boot or shoe is in use.

The forms of the invention which are illustrated in the drawings have as a characteristic in common the feature that the barbs or projections thereof are inclined in a direction away from the entering edge of the protector. This facilitates the entrance of the improved protector into the material of the sole or heel in which it is driven, while fitting the said barbs or shoulders the more effectually to serve to prevent the withdrawal of the protectors from the said material after having once been set therein.

A feature of the invention is the fact that the thickness of the strip of which the protector is formed is no greater at the shoulder and in many cases is less than the thickness of the tread portion. (See Figs. 1, 8, 13, 14, &c.) This provides against the leather of the heel or sole being spread or opened around the protector, so as to leave a visible crack or space such as would mar the appearance of the heel or sole.

What I claim is—

1. A heel or sole protector consisting of a strip bent to inclose a part of the material into which it is driven, having a wedge-shaped entering edge and thereby adapted to produce the incision into which it is driven to enable it to be driven into a heel or sole from the exterior thereof, and formed along the surface of the protector with inclined projections the upper portions of which constitute barbs or shoulders which engage with the leather when the protector is set and hold it from retraction, the protector not exceeding in its thickness at the shoulders or barbs that of the wear-resisting edge or tread substantially as set forth.

2. A heel or sole protector consisting of a strip bent to inclose a part of the material into which it is driven, having a wedge-shaped entering edge and thereby adapted to produce the incision into which it is driven, to enable it to be driven into a heel or sole from the exterior thereof, having a thickened wear-resisting edge or tread, and provided intermediate its width with a longitudinally-extending shoulder, the protector not exceeding in its thickness at the shoulder that of the said wear-resisting edge or tread, the said shoulder operating to prevent the withdrawal of the protector, substantially as set forth.

In testimony whereof I affix my signature in presence of two witnesses.

GEORGE H. WILLIAMS.

Witnesses:
WM. A. MACLEOD,
ALICE H. MORRISON.